US010425629B2

United States Patent
Singh et al.

(10) Patent No.: US 10,425,629 B2
(45) Date of Patent: Sep. 24, 2019

(54) SYSTEM FOR DENSE REGISTRATION OF TWO-DIMENSIONAL DEPTH IMAGES

(71) Applicant: Siemens Healthcare GmbH, Erlangen (DE)

(72) Inventors: Vivek Kumar Singh, Princeton, NJ (US); Stefan Kluckner, Berlin (DE); Yao-jen Chang, Princeton, NJ (US); Kai Ma, West Windsor, NJ (US); Terrence Chen, Princeton, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 293 days.

(21) Appl. No.: 15/635,601

(22) Filed: Jun. 28, 2017

(65) Prior Publication Data
US 2019/0007671 A1    Jan. 3, 2019

(51) Int. Cl.
*H04N 13/207*    (2018.01)
*H04N 13/128*    (2018.01)
(Continued)

(52) U.S. Cl.
CPC .......... *H04N 13/207* (2018.05); *G06T 7/593* (2017.01); *H04N 13/128* (2018.05);
(Continued)

(58) Field of Classification Search
None
See application file for complete search history.

(56) References Cited

U.S. PATENT DOCUMENTS

| 9,524,582 | B2* | 12/2016 | Ma | G06T 17/20 |
| 2012/0169848 | A1* | 7/2012 | Bae | G01S 7/4861 |
| | | | | 348/46 |
| 2015/0063681 | A1* | 3/2015 | Bhardwaj | G06K 9/00208 |
| | | | | 382/154 |

OTHER PUBLICATIONS

Anguelov, Dragomir et al. "The Correlated Correspondence Algorithm for Unsupervised Registration of Nonrigid Surfaces", Stanford AI Lab Technical Report SAIL-2004-100, 2004, 9 pp.
(Continued)

*Primary Examiner* — Kaitlin A Retallick

(57) ABSTRACT

A system and method includes generation of a first map of first descriptors based on pixels of a first two-dimensional depth image, where a location of each first descriptor in the first map corresponds to a location of a respective pixel of a first two-dimensional depth image, generation of a second map of second descriptors based on pixels of the second two-dimensional depth image, where a location of each second descriptor in the second map corresponds to a location of a respective pixel of the second two-dimensional depth image, upsampling of the first map of descriptors using a first upsampling technique to generate an upsampled first map of descriptors, upsampling of the second map of descriptors using a second upsampling technique to generate an upsampled second map of descriptors, generation of a descriptor difference map based on differences between descriptors of the upsampled first map of descriptors and descriptors of the upsampled second map of descriptors, generation of a geodesic preservation map based on differences between geodesic distances between pairs of descriptors of the upsampled first map of descriptors and geodesic distances between corresponding pairs of descriptors of the upsampled second map of descriptors, and generation of a mapping between pixels of the first two-dimensional depth image and pixels of the second two-dimensional depth
(Continued)

image based on the descriptor difference map and on the geodesic preservation map.

20 Claims, 9 Drawing Sheets

(51) Int. Cl.
*G06T 7/593* (2017.01)
*H04N 13/00* (2018.01)
*H04N 13/271* (2018.01)

(52) U.S. Cl.
CPC ... *H04N 13/271* (2018.05); *H04N 2013/0081* (2013.01); *H04N 2213/003* (2013.01)

(56) References Cited

OTHER PUBLICATIONS

Ernst, Jan et al. "Discrete Texture Traces: Topological Representation of Geometric Context", 2012, 8 pp.
Choy, Christopher et al., "Universal Correspondence Network", Oct. 31, 2016, 17 pp.

* cited by examiner

SYSTEM FOR DENSE REGISTRATION OF TWO-DIMENSIONAL DEPTH IMAGES

BACKGROUND

Depth cameras are used in many applications, including but not limited to gaming, manufacturing and medical imaging. Conventional depth cameras provide the ability to acquire a rich representation of a scene in a compact and easy-to-implement manner. A depth camera, mounted in a single stationary position, acquires image data which consists of a two-dimensional image (e.g., a two-dimensional RGB image, in which each pixel is assigned a Red, a Green and a Blue value), and a depth image, in which the value of each pixel corresponds to a depth or distance of the pixel from the depth camera. This image data, consisting of a two-dimensional image and a depth image, will be referred to herein as a two-dimensional depth image.

It is often desirable to register two-dimensional depth images with one another. Registration may entail establishing correspondences between pixels of one two-dimensional depth image and pixels of another two-dimensional depth image. For example, pixels which depict a shoulder of a patient in a first two-dimensional depth image are preferably identified as corresponding to pixels depicting the patient's shoulder in a second two-dimensional depth image, even if the shoulder has moved within the image frame. Registration may facilitate the tracking of objects through multiple successively-acquired two-dimensional depth images, the association of portions of a two-dimensional depth image with features of a corresponding model of the imaged object, and many other use cases. However, current systems for registering two-dimensional depth images are inefficient or otherwise unsuitable, particularly in the case of non-rigid registration.

DETAILED DESCRIPTION

The following description is provided to enable any person in the art to make and use the described embodiments and sets forth the best mode contemplated for carrying out the described embodiments. Various modifications, however, will remain apparent to those in the art.

Figure 1:
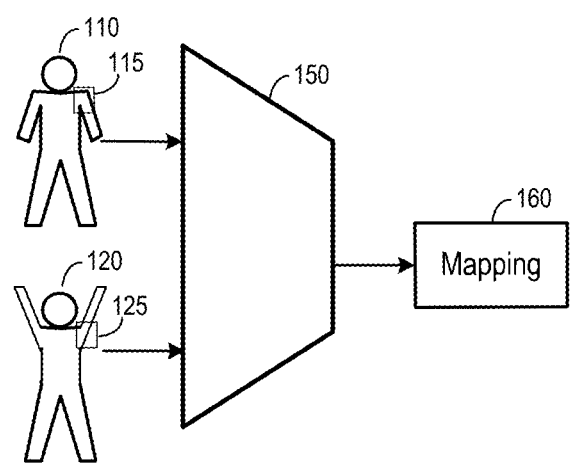
FIG. 1 is a block diagram of a system according to some embodiments.

Some embodiments operate to obtain a mapping between points of a pair of two-dimensional depth images. FIG. 1 is a block diagram illustrating a system according to some embodiments. Two-dimensional depth images 110 and 120 of a same object are received by processing network 150, which generates mapping 160 based on the received images. Mapping 160 specifies correspondences between respective points of images 110 and 120. For example, mapping 160 may indicate that certain points of area 115 of image 110 correspond to certain other points of area 125 of image 120. In the present example, such correspondences are appropriate because areas 115 and 125 correspond to a same region of the imaged object.

Figure 2:
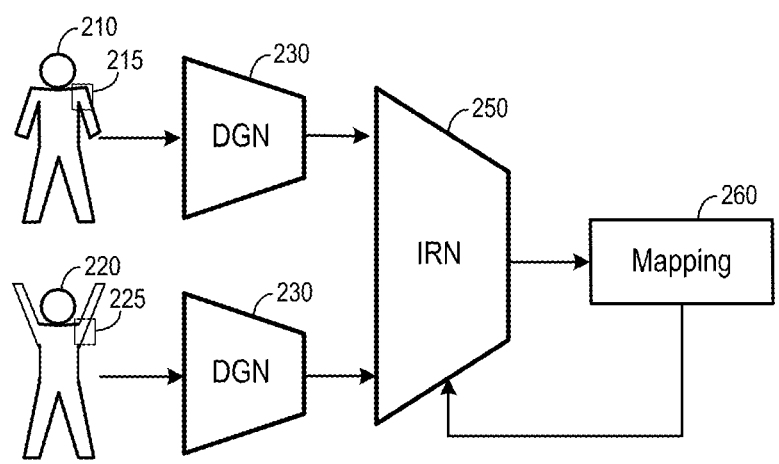
FIG. 2 is a block diagram illustrating a system according to some embodiments.

FIG. 2 illustrates a system according to further embodiments. According to the FIG. 2 system, mapping 260 is generated using descriptor generation network 230 and iterative registration network 250. Mapping 260 specifies correspondences between respective points of two-dimensional depth images 210 and 220. Descriptor generation network 230 generates an m-dimensional descriptor for each pixel in each image 210, and also generates an m-dimensional descriptor for each pixel in each image 220. Each set of m-dimensional descriptors is input to iterative registration network 250, which generates mapping 260 so as to minimize the difference between the descriptors of mapped pixel pairs and to preserve geodesic distances between corresponding pairs of pixels from each depth image. Preservation of geodesic distances ensures that the geodesic distance between two pixels of depth image 210 is similar to the geodesic distance between two pixels of depth image 220 to which the two pixels of depth image 210 are mapped.

Figure 3:
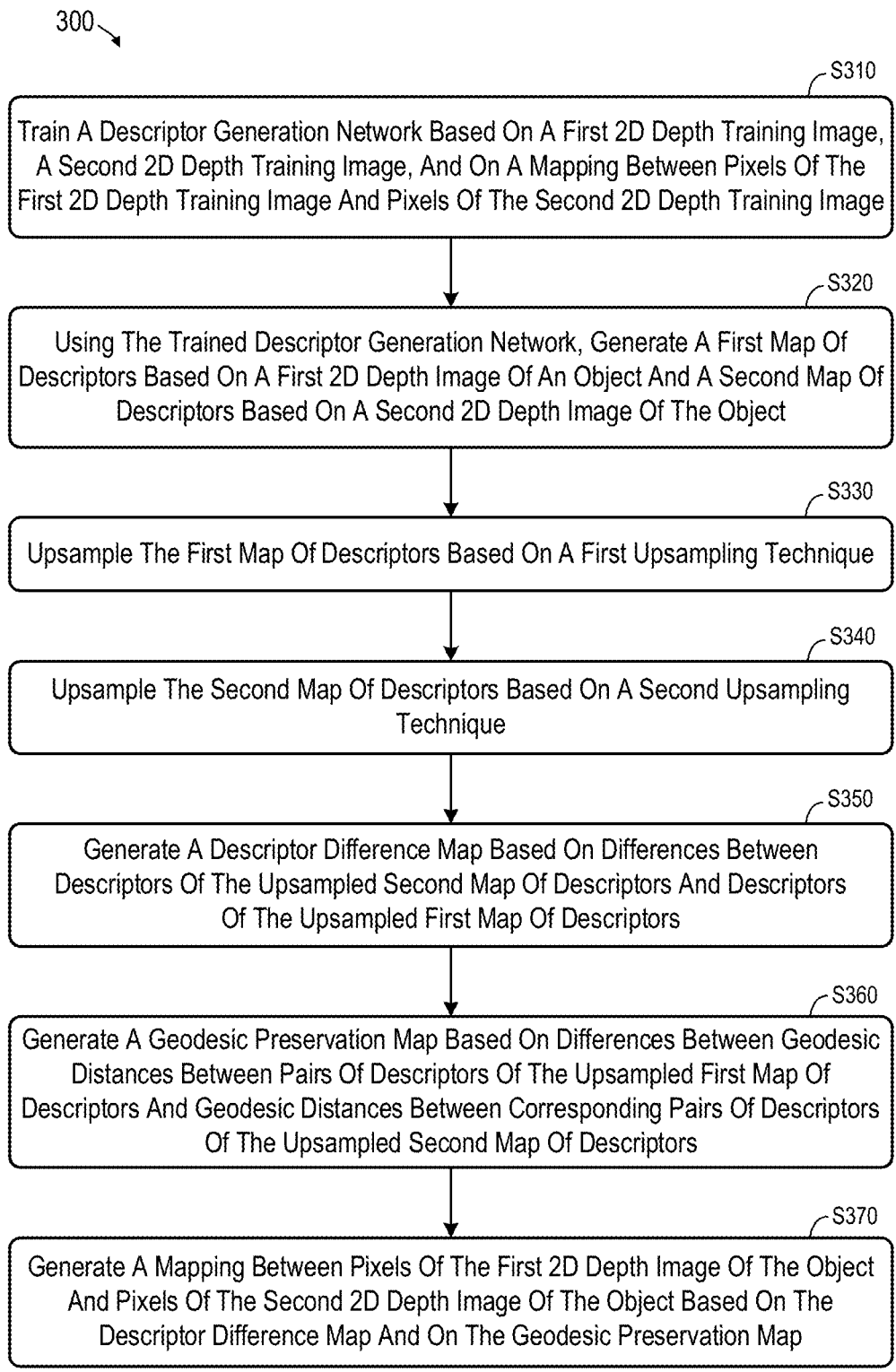
FIG. 3 is a flow diagram of process to generate a graph according to some embodiments.

FIG. 3 is a flow diagram of process 300 according to some embodiments. Process 300 and the other processes described herein may be performed using any suitable combination of hardware, software or manual means. Software embodying these processes may be stored by any non-transitory tangible medium, including a fixed disk, a floppy disk, a CD, a DVD, a Flash drive, or a magnetic tape. Embodiments are not limited to the examples described below.

Initially, a descriptor generation network is trained at S310. As described above, the descriptor generation network generates an m-dimensional descriptor for each pixel in a two-dimensional depth image. The descriptor generation network is trained at S310 so that a first descriptor generated by the network for a pixel of a first depth image of an object is proximate, in the m-dimensional space, to a second descriptor generated by the network for a pixel of a second depth image which represents a same point on the object.

Figure 4:
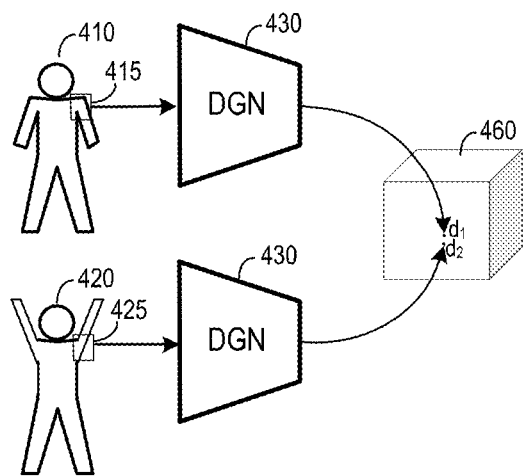
FIG. 4 is a block diagram illustrating descriptor generation according to some embodiments.

FIG. 4 is a generalized representation of operation of a trained descriptor generation network according to some embodiments. Two-dimensional depth image 410 includes pixels representing shoulder region 415 of the imaged body. Similarly, two-dimensional depth image 420 includes pixels representing shoulder region 425 of the imaged body. Descriptor generation network 430 generates an m-dimensional descriptor based on a pixel of region 415, and the generated descriptor is located at point $d_1$ in m-dimensional space 460. The same descriptor generation network 430 generates an m-dimensional descriptor based on a pixel of region 425, and this generated descriptor is located at point $d_2$ in m-dimensional space 460. Points $d_1$ and $d_2$ are proximate to one another in m-dimensional space 460, indicating a correspondence between their respective depth image pixels.

Returning to S310, the descriptor generation network is trained based on a first two-dimensional depth training image, a second two-dimensional depth training image, and on a mapping between pixels of the first two-dimensional depth training image and pixels of the second two-dimensional depth training image. A descriptor generation network according to some embodiments may comprise a convolutional neural network, but embodiments are not limited thereto.

Figure 5:
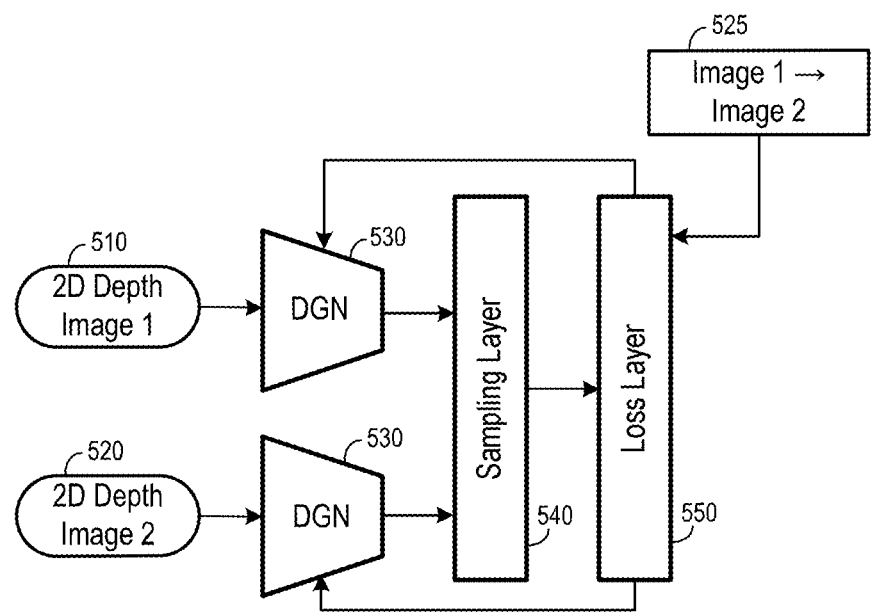
FIG. 5 is a block diagram illustrating descriptor generation network training according to some embodiments.

FIG. 5 illustrates training of a descriptor generation network according to some embodiments. As shown, two instances of a same descriptor generation network 530 are trained simultaneously. Training the descriptor generation network uses two-dimensional depth training image 510, two-dimensional depth training image 520, and mapping 525 of corresponding pairs of pixels of images 510 and 520. That is, mapping 525 indicates, for each pixel of image 510, a corresponding pixel of image 520.

During training, the first instance of descriptor generation network 530 generates a descriptor for each pixel of image 510 and the second instance of descriptor generation network 530 generates a descriptor for each pixel of image 520. Sampling layer 540 samples several triplets consisting of a descriptor of a first pixel of the first image, a descriptor of a second pixel of the second image which is known (via mapping 560) to be in a corresponding neighborhood of the first pixel of the first image, and a third pixel of the second image which is known (also via mapping 560) to not be in a corresponding neighborhood of the first pixel of the first image.

Next, loss layer 550 evaluates each triplet to ensure that the descriptors of the first and second pixel are "closer" to each other in the m-dimensional space than the descriptors of the first and third pixel. This evaluation may comprise evaluation of a loss function (e.g., $\Sigma_{\forall x} L(x, p(x), n(x))$, and loss layer 550 back-propagates the determined loss in the same manner to each instance of descriptor generation network 530 to minimize the loss. The foregoing iterates until the loss reaches an acceptable level, at which point descriptor generation network 530 is considered trained.

The remainder of process 300 operates to determine correspondences between pixels of two different two-dimensional depth images. According to some embodiments, the depth images are images of a same scene and/or object(s) (e.g., a same patient lying in two different poses).

At S320, a first map of descriptors is generated based on a first two-dimensional depth image using the trained descriptor generation network. Also, a second map of descriptors is generated based on a second two-dimensional depth image using the trained descriptor generation network.

Figure 6:
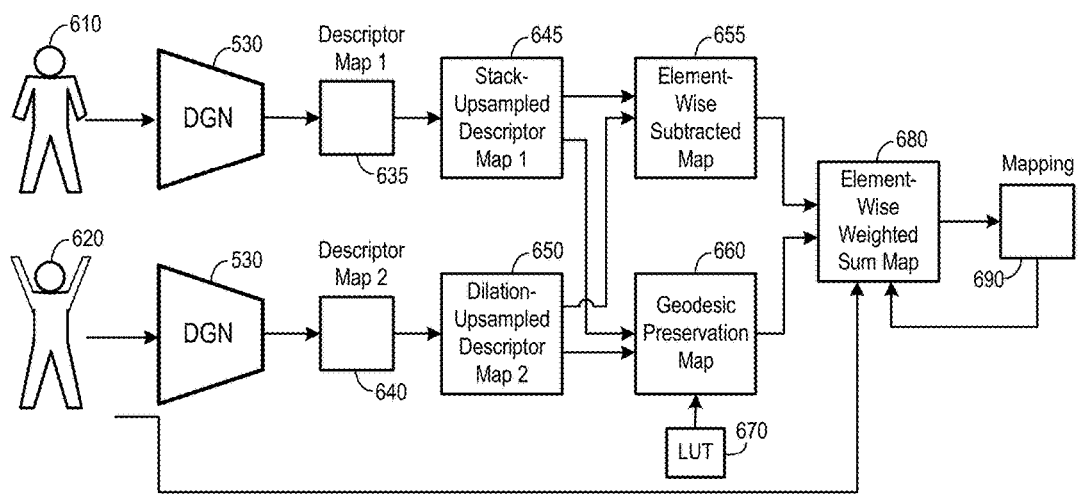
FIG. 6 is a block diagram illustrating a system according to some embodiments.

FIG. 6 illustrates S320 according to some embodiments. Two-dimensional depth image 610 is input to trained descriptor generation network 530, which generates descriptor map 635. Each location of descriptor map 635 includes a descriptor of a pixel which is located at the same location within image 610. Similarly, two-dimensional depth image 620 is input to trained descriptor generation network 530, which generates descriptor map 640 based thereon.

Figure 7:
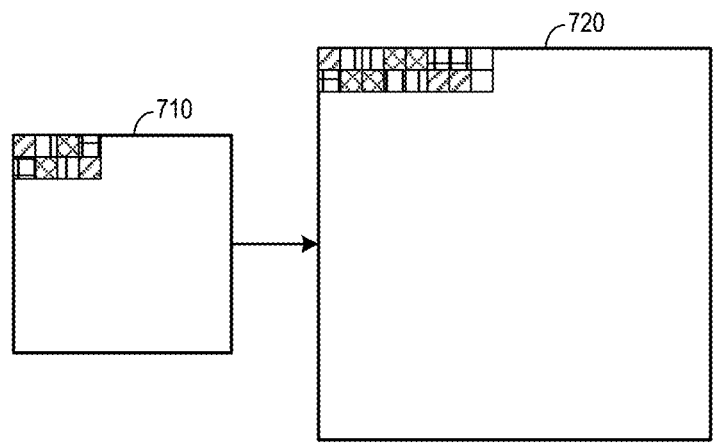
FIG. 7 illustrates stack upsampling according to some embodiments.

Next, at S330, the first map of descriptors is upsampled based on a first upsampling technique. According to the illustrated embodiment, descriptor map 645 is stack-upsampled at S330, resulting in stack-upsampled descriptor map 645. FIG. 7 illustrates a stack-upsampling technique according to some embodiments. As shown, each pixel of image 710 is represented by four (i.e., 2×2) pixels in upsampled image 720. Upsampled image 710 illustrates only the upsampled pixels of the first row of image 710. Any upsampling window (H×W) may be used in some embodiments. In the illustrated embodiment, a source pixel of image 710 is represented in image 720 by the pixels within a 2×2 mask of image 710, where the source pixel is in the upper left corner (i.e., the first column and first row) of the mask.

Figure 8:
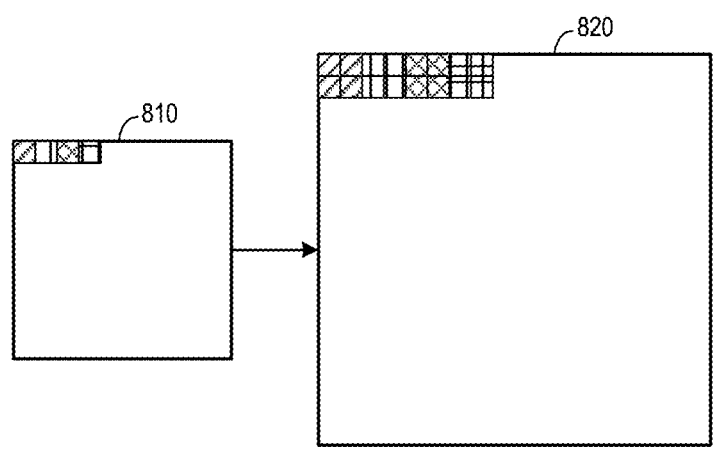
FIG. 8 illustrates dilation upsampling according to some embodiments.

The second map of descriptors is upsampled at S340 based on a second upsampling technique. According to some embodiments, the second upsampling technique is identical to the first upsampling technique. FIG. 8 illustrates a dilation-upsampling technique which may be used as the second upsampling technique in some embodiments. Each pixel of image 810 is represented by four (i.e., 2×2) identical pixels in upsampled image 820. Any upsampling window (H×W) may be used in some embodiments. Upsampled image 820 shows the upsampled version of each pixel shown in image 810.

At S350, a descriptor difference map is generated based on differences between descriptors of the upsampled second map of descriptors and descriptors of the upsampled first map of descriptors. The descriptor difference map is illustrated in FIG. 6 as element-wise subtracted map 655.

Figure 9:
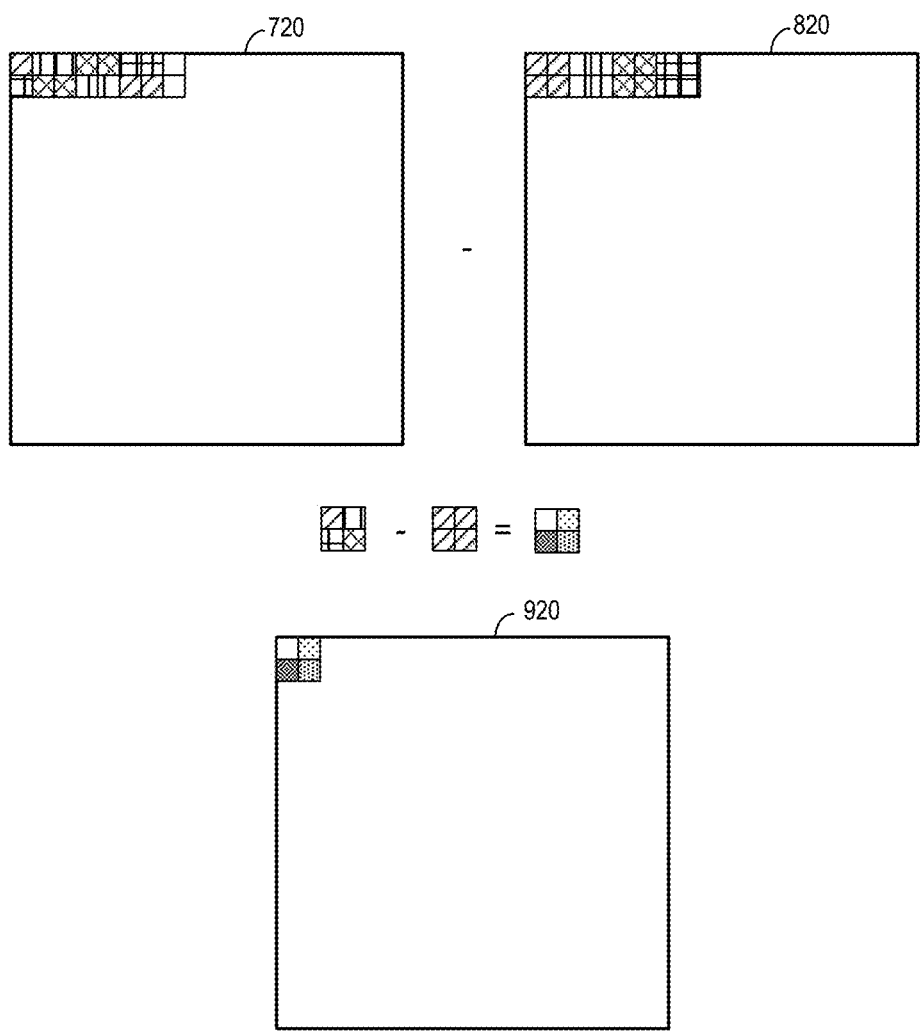
FIG. 9 illustrates element-wise subtraction according to some embodiments.

According to some embodiments, each pixel of the descriptor difference map has a value equal to the difference between the descriptors at the same pixel location of the two upsampled descriptor maps. FIG. 9 shows upsampled map 720 and upsampled map 820 of FIGS. 7 and 8, respectively. The illustrated pixels of descriptor difference map 920 represent differences between corresponding pixels of upsampled map 720 and upsampled map 820. Although the pixels of upsampled map 720 represent a simple subtraction operation, some embodiments may generate the descriptor difference map based on any function of the differences between descriptors.

S360 includes generation of a geodesic preservation map. A geodesic preservation map according to some embodiments indicates a degree to which geodesic distances between pairs of descriptors of the upsampled first map of descriptors match geodesic distances between corresponding pairs of descriptors of the upsampled second map of descriptors. According to some embodiments, the descriptors of a corresponding pair are within a local neighborhood (e.g., a 5×5 window) of one another. For example, in some embodiments, the geodesic preservation map $i_{(j)} = \min_x \{d(S_i, S_{i+1}) - d(T_{(j)}, T_x)\}$. $d(S_i, S_{i+1})$ is the geodesic distance between neighboring points in source image $S_i$ and $S_{i+1}$; $i_{(j)}$ is the lowest difference when comparing all the geodesics between $T_j$ and its neighbors $T_x$ with the geodesic between $S_i$ and its neighbor $S_{i+1}$.

The geodesic distance between pairs of descriptors may be captured within lookup table 670. For example, assuming the input two-dimensional depth images represent a same object (a human body), then the geodesic distances can be learned prior to process 300 by using a learning network to predict the geodesic distance between the descriptors of two points on the object's surface. Specifically, several two-dimensional depth images having different viewpoints may be generated from a three-dimensional model of the object. Since the images are generated from the model, both the point correspondences and the geodesic distances are known. Using this data and the trained descriptor generation network, look up table 670 can be obtained that takes two descriptors as input and outputs a predicted geodesic distance. Alternatively, machine learning may be used to train a regressor to predict the geodesic distance.

If a three-dimensional model of the object is unavailable, then the geodesic distances of lookup table 670 may be determined using a chain of descriptors. For example, given two points on an image, the geodesic may be defined by a sequence of descriptors connecting the two points, where each descriptor is within a certain local neighborhood of the previous descriptor in the sequence.

Next, at S370, a mapping is generated between pixels of the first two-dimensional depth image of the object and pixels of the second two-dimensional depth image of the object based on the descriptor difference map and on the geodesic preservation map. According to some embodiments, the mapping 690 is generated based on an element-by-element summation 680 of descriptor difference map 655 and geodesic preservation map 660.

For example, map 690 may be created from summation 680 by finding the location of the local minima in the local neighborhood. A points (x, y) in 690 stores the values (dx, dy) such that the point (x,y) in source image correspond to the point (x+dx, y+dy) in the target image. Given the 680 map, which stores the matching scores (0036) between various possible correspondence candidates between the source and target image, we find the best matching one and store the difference in coordinates dx and dy.

Generation of mapping 690 may be iterative as illustrated in FIG. 6, using the following loss function as follows:

$$E(l) = \Sigma_{i,j=1}^{n} \rho(d_S(s_i,s_j), d_T(t_{l_i}, t_{l_j})) + \lambda \Sigma_i \|s_i - t_{l_i}\|,$$

where $\Sigma_{i,j=1}^{n}$ represents a sum over all pairs of points, where $\rho(d_S(s_i,s_j), d_T(t_{l_i}, t_{l_j}))$ is a pairwise term preserving geodesic distances in the mapping, $d_S$ and $d_T$ are the two shapes, and $s_i$, $s_j$, $t_{l_i}$, $t_{l_j}$ are samples which densely cover the two shapes. $\lambda \Sigma_i \|s_i - t_{l_i}\|$ is a unary term to distinguish symmetries and constrains to correspond close points on both shapes. Accordingly, iterating mapping 690 to minimize loss function E(l) may jointly optimize the matching score between descriptors of corresponding points while preserving the geodesic distance between point pairs.

FIG. 6 also illustrates an embodiment in which map 680 is regularized based on the input data in order to smooth mapping 690. For instance, mapping 690 may be discontinuous near the depth or image boundaries.

Figure 10:
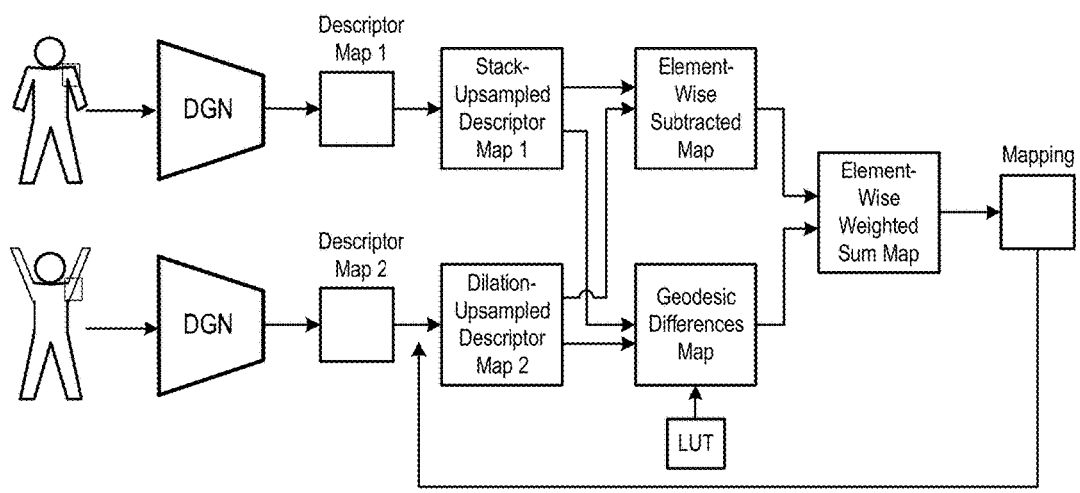
FIG. 10 is a block diagram illustrating a system according to some embodiments.

In contrast, FIG. 10 illustrates an embodiment in which the recurrent may also feed back to the output of the descriptor generation network. This feedback enables modification of the stacked and dilation upsampling search parameters (e.g., location and size of region of interest) based on an initial mapping. These parameters may be refined over multiple iterations in a coarse to fine progression.

Figure 11:
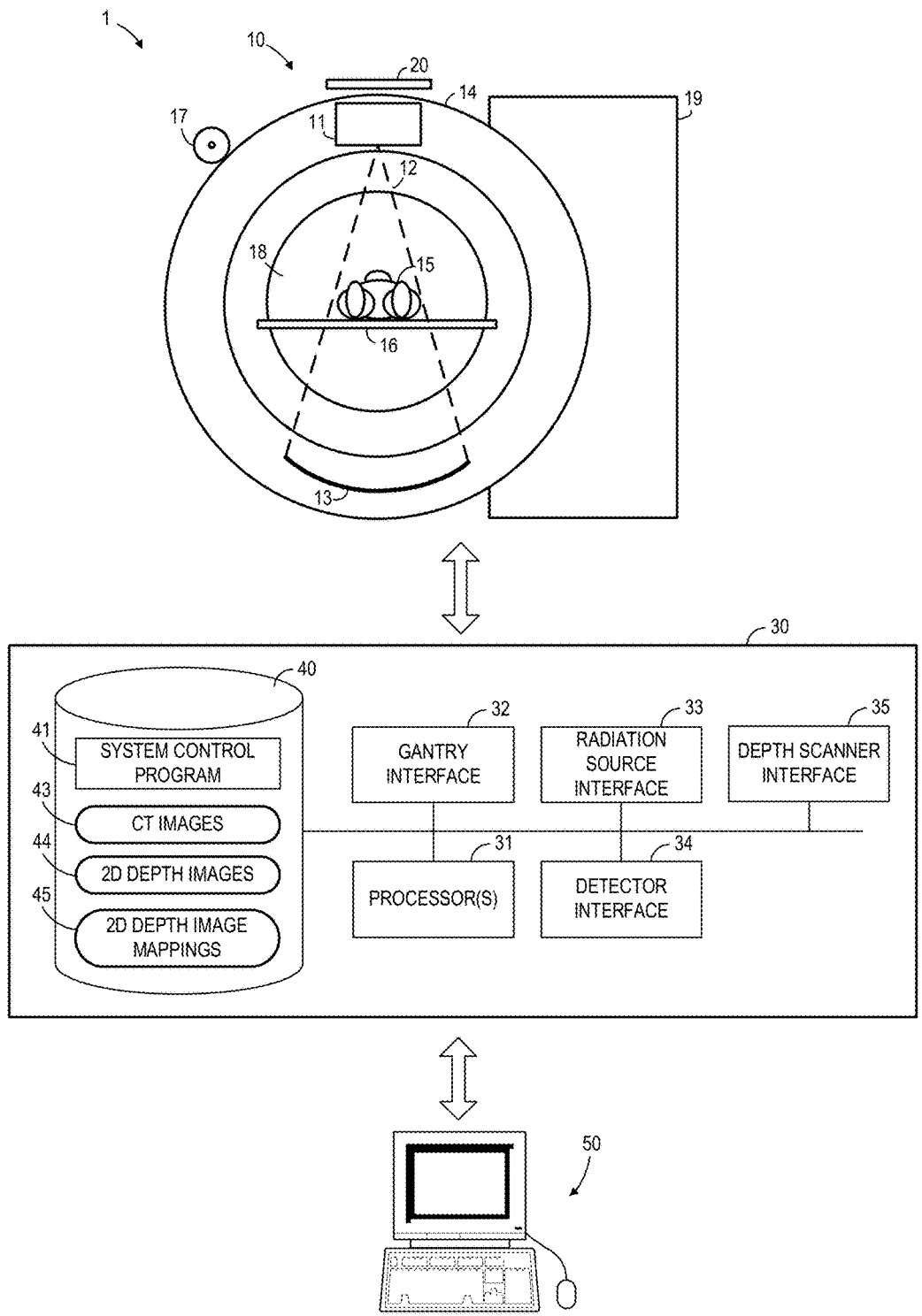
FIG. 11 illustrates a system according to some embodiments.

FIG. 11 illustrates system 1 according to some embodiments. System 1 may be operated to acquire two-dimensional depth images and/or generate a mapping according to some embodiments. Embodiments are not limited to system 1 to perform either function.

System 1 includes x-ray imaging system 10, scanner 20, control and processing system 30, and operator terminal 50. Generally, and according to some embodiments, X-ray imaging system 10 acquires two-dimensional X-ray images of a patient volume and scanner 20 acquires surface images of a patient. Control and processing system 30 controls X-ray imaging system 10 and scanner 20, and receives the acquired images therefrom. Control and processing system 30 processes the images to generate a mesh image as described below. Such processing may be based on user input received by terminal 50 and provided to control and processing system 30 by terminal 50.

Imaging system 10 comprises a CT scanner including X-ray source 11 for emitting X-ray beam 12 toward opposing radiation detector 13. Embodiments are not limited to CT data or to CT scanners. X-ray source 11 and radiation detector 13 are mounted on gantry 14 such that they may be rotated about a center of rotation of gantry 14 while maintaining the same physical relationship therebetween.

Radiation source 11 may comprise any suitable radiation source, including but not limited to a Gigalix™ x-ray tube. In some embodiments, radiation source 11 emits electron, photon or other type of radiation having energies ranging from 50 to 150 keV.

Radiation detector 13 may comprise any system to acquire an image based on received x-ray radiation. In some embodiments, radiation detector 13 is a flat-panel imaging device using a scintillator layer and solid-state amorphous silicon photodiodes deployed in a two-dimensional array. The scintillator layer receives photons and generates light in proportion to the intensity of the received photons. The array of photodiodes receives the light and records the intensity of received light as stored electrical charge.

In other embodiments, radiation detector 13 converts received photons to electrical charge without requiring a scintillator layer. The photons are absorbed directly by an array of amorphous selenium photoconductors. The photoconductors convert the photons directly to stored electrical charge. Radiation detector 13 may comprise a CCD or tube-based camera, including a light-proof housing within which are disposed a scintillator, a mirror, and a camera.

The charge developed and stored by radiation detector 13 represents radiation intensities at each location of a radiation field produced by x-rays emitted from radiation source 11. The radiation intensity at a particular location of the radiation field represents the attenuative properties of mass (e.g., body tissues) lying along a divergent line between radiation source 11 and the particular location of the radiation field. The set of radiation intensities acquired by radiation detector 13 may therefore represent a two-dimensional projection image of this mass.

To generate X-ray images, patient 15 is positioned on bed 16 to place a portion of patient 15 between X-ray source 11 and radiation detector 13. Next, X-ray source 11 and radiation detector 13 are moved to various projection angles with respect to patient 15 by using rotation drive 17 to rotate gantry 14 around cavity 18 in which patient 15 is positioned. At each projection angle, X-ray source 11 is powered by high-voltage generator 19 to transmit X-ray radiation 12 toward detector 13. Detector 13 receives the radiation and produces a set of data (i.e., a raw X-ray image) for each projection angle.

Scanner 20 may comprise a depth camera. Scanner 20 may acquire depth images as described above. A depth camera may comprise a structured light-based camera (e.g., Microsoft Kinect or ASUS Xtion), a stereo camera, or a time-of-flight camera (e.g., Creative TOF camera) according to some embodiments.

System 30 may comprise any general-purpose or dedicated computing system. Accordingly, system 30 includes one or more processors 31 configured to execute processor-executable program code to cause system 30 to operate as described herein, and storage device 40 for storing the program code. Storage device 40 may comprise one or more fixed disks, solid-state random access memory, and/or removable media (e.g., a thumb drive) mounted in a corresponding interface (e.g., a USB port).

Storage device 40 stores program code of system control program 41. One or more processors 31 may execute system control program 41 to move gantry 14, to move table 16, to cause radiation source 11 to emit radiation, to control detector 13 to acquire an image, to control scanner 20 to acquire an image, and to perform any other function. In this regard, system 30 includes gantry interface 32, radiation source interface 33 and depth scanner interface 35 for communication with corresponding units of system 10.

Two-dimensional X-ray data acquired from system 10 may be stored in data storage device 40 as CT images 43, in DICOM or another data format. Each image 43 may be further associated with details of its acquisition, including but not limited to time of acquisition, imaging plane position and angle, imaging position, radiation source-to-detector distance, patient anatomy imaged, patient position, contrast medium bolus injection profile, x-ray tube voltage, image resolution and radiation dosage. CT images 43 may also include three-dimensional CT images reconstructed from corresponding two-dimensional CT images as is known in the art.

Device 40 also stores two-dimensional depth images 44 acquired by scanner 20. In some embodiments, a two-dimensional depth image 44 may be associated with a set of CT images 42, in that the associated image/frames were acquired at similar times while patient 15 was lying in substantially the same position. Two-dimensional depth image mappings 45 may contain registration information between two two-dimensional depth images and generated as described herein. One or more processors 31 may execute system control program 41 to generate mappings 45 as described herein.

Terminal 50 may comprise a display device and an input device coupled to system 30. Terminal 50 may display any of CT images 43 and two-dimensional depth images 44, and may receive user input for controlling display of the images, operation of imaging system 10, and/or the processing described herein. In some embodiments, terminal 50 is a separate computing device such as, but not limited to, a desktop computer, a laptop computer, a tablet computer, and a smartphone.

Each of system 10, scanner 20, system 30 and terminal 40 may include other elements which are necessary for the operation thereof, as well as additional elements for providing functions other than those described herein.

According to the illustrated embodiment, system 30 controls the elements of system 10. System 30 also processes images received from system 10. Moreover, system 30 receives input from terminal 50 and provides images to terminal 50. Embodiments are not limited to a single system performing each of these functions. For example, system 10 may be controlled by a dedicated control system, with the acquired frames and images being provided to a separate image processing system over a computer network or via a physical storage medium (e.g., a DVD).

Embodiments are not limited to a CT scanner and an RGB+D scanner as described above with respect to FIG. 1. For example, embodiments may employ any other imaging modalities (e.g., a magnetic resonance scanner, a positron-emission scanner, etc.) for acquiring surface data.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A system comprising:
   an image acquisition system to acquire two-dimensional depth images; and
   a processor to:
   instruct the image acquisition system to acquire a first two-dimensional depth image and a second two-dimensional depth image;
   generate a first map of first descriptors based on pixels of the first two-dimensional depth image, where a location of each first descriptor in the first map corresponds to a location of a respective pixel of the first two-dimensional depth image;
   generate a second map of second descriptors based on pixels of the second two-dimensional depth image, where a location of each second descriptor in the second map corresponds to a location of a respective pixel of the second two-dimensional depth image;
   upsample the first map of descriptors using a first upsampling technique to generate an upsampled first map of descriptors;
   upsample the second map of descriptors using a second upsampling technique to generate an upsampled second map of descriptors;
   generate a descriptor difference map based on differences between descriptors of the upsampled first map of descriptors and descriptors of the upsampled second map of descriptors;
   generate a geodesic preservation map based on differences between geodesic distances between pairs of descriptors of the upsampled first map of descriptors and geodesic distances between corresponding pairs of descriptors of the upsampled second map of descriptors; and
   generate a mapping between pixels of the first two-dimensional depth image and pixels of the second two-dimensional depth image based on the descriptor difference map and on the geodesic preservation map.

2. A system according to claim 1, wherein the first upsampling technique is a stack upsampling technique and the second upsampling technique is a dilation upsampling technique.

3. A system according to claim 1, wherein generation of the first map of first descriptors comprises input of the first two-dimensional depth image to a descriptor generation network, and
   wherein generation of the second map of second descriptors comprises input of the second two-dimensional depth image to the descriptor generation network.

4. A system according to claim 3, the processor further to:
   train the descriptor generation network based on a first two-dimensional depth training image, a second two-dimensional depth training image, and a mapping between pixels of the first two-dimensional depth training image and pixels of the second two-dimensional depth training image.

5. A system according to claim 1, wherein the descriptors of each pair of descriptors of the upsampled first map of descriptors used to generate the geodesic preservation map are located in a respective local neighborhood of one another, and wherein the descriptors of each pair of descriptors of the upsampled second map of descriptors used to generate the geodesic preservation map are located in a respective local neighborhood of one another.

6. A system according to claim 1, wherein generation of the mapping comprises:
   summation of the descriptor difference map and the geodesic preservation map according to respective weights to generate a weighted sum map;
   generation of the mapping based on the weighted sum map;
   evaluation of a loss function; and modification of the respective weights based on the evaluated loss function.

7. A system according to claim 1, wherein generation of the mapping comprises:
summation of the descriptor difference map and the geodesic preservation map according to respective weights to generate a weighted sum map;
generation of the mapping based on the weighted sum map;
evaluation of a loss function; and
modification of the second upsampling technique based on the evaluated loss function.

8. A method, comprising:
generating a first map of first descriptors based on pixels of a first two-dimensional depth image, where a location of each first descriptor in the first map corresponds to a location of a respective pixel of the first two-dimensional depth image;
generate a second map of second descriptors based on pixels of a second two-dimensional depth image, where a location of each second descriptor in the second map corresponds to a location of a respective pixel of the second two-dimensional depth image;
upsampling the first map of descriptors using a first upsampling technique to generate an upsampled first map of descriptors;
upsampling the second map of descriptors using a second upsampling technique to generate an upsampled second map of descriptors;
generating a descriptor difference map based on differences between descriptors of the upsampled first map of descriptors and descriptors of the upsampled second map of descriptors;
generating a geodesic preservation map based on differences between geodesic distances between pairs of descriptors of the upsampled first map of descriptors and geodesic distances between corresponding pairs of descriptors of the upsampled second map of descriptors; and
generating a mapping between pixels of the first two-dimensional depth image and pixels of the second two-dimensional depth image based on the descriptor difference map and on the geodesic preservation map.

9. A method according to claim 8, wherein the first upsampling technique is a stack upsampling technique and the second upsampling technique is a dilation upsampling technique.

10. A method according to claim 8, wherein generating the first map of first descriptors comprises inputting the first two-dimensional depth image to a descriptor generation network, and
wherein generating the second map of second descriptors comprises inputting the second two-dimensional depth image to the descriptor generation network.

11. A method according to claim 10, further comprising:
training the descriptor generation network based on a first two-dimensional depth training image, a second two-dimensional depth training image, and a mapping between pixels of the first two-dimensional depth training image and pixels of the second two-dimensional depth training image.

12. A method according to claim 8, wherein the descriptors of each pair of descriptors of the upsampled first map of descriptors used to generate the geodesic preservation map are located in a respective local neighborhood of one another, and wherein the descriptors of each pair of descriptors of the upsampled second map of descriptors used to generate the geodesic preservation map are located in a respective local neighborhood of one another.

13. A method according to claim 8, wherein generating the mapping comprises:
summing the descriptor difference map and the geodesic preservation map according to respective weights to generate a weighted sum map;
generating the mapping based on the weighted sum map;
evaluating a loss function; and
modifying the respective weights based on the evaluated loss function.

14. A method according to claim 8, wherein generating the mapping comprises:
summing the descriptor difference map and the geodesic preservation map according to respective weights to generate a weighted sum map;
generating of the mapping based on the weighted sum map;
evaluating a loss function; and
modifying the second upsampling technique based on the evaluated loss function.

15. A non-transitory computer-readable medium storing processor-executable process steps, the process steps executable by a processor to cause a system to:
generate a first map of first descriptors based on pixels of a first two-dimensional depth image, where a location of each first descriptor in the first map corresponds to a location of a respective pixel of a first two-dimensional depth image;
generate a second map of second descriptors based on pixels of the second two-dimensional depth image, where a location of each second descriptor in the second map corresponds to a location of a respective pixel of the second two-dimensional depth image;
upsample the first map of descriptors using a first upsampling technique to generate an upsampled first map of descriptors;
upsample the second map of descriptors using a second upsampling technique to generate an upsampled second map of descriptors;
generate a descriptor difference map based on differences between descriptors of the upsampled first map of descriptors and descriptors of the upsampled second map of descriptors;
generate a geodesic preservation map based on differences between geodesic distances between pairs of descriptors of the upsampled first map of descriptors and geodesic distances between corresponding pairs of descriptors of the upsampled second map of descriptors; and
generate a mapping between pixels of the first two-dimensional depth image and pixels of the second two-dimensional depth image based on the descriptor difference map and on the geodesic preservation map.

16. A non-transitory computer-readable medium according to claim 15, wherein the first upsampling technique is a stack upsampling technique and the second upsampling technique is a dilation upsampling technique.

17. A non-transitory computer-readable medium according to claim 15, wherein generation of the first map of first descriptors comprises input of the first two-dimensional depth image to a descriptor generation network, and
wherein generation of the second map of second descriptors comprises input of the second two-dimensional depth image to the descriptor generation network.

18. A non-transitory computer-readable medium according to claim 17, the process steps executable by a processor to cause a system to:
   train the descriptor generation network based on a first two-dimensional depth training image, a second two-dimensional depth training image, and a mapping between pixels of the first two-dimensional depth training image and pixels of the second two-dimensional depth training image.

19. A non-transitory computer-readable medium according to claim 15, wherein the descriptors of each pair of descriptors of the upsampled first map of descriptors used to generate the geodesic preservation map are located in a respective local neighborhood of one another, and wherein the descriptors of each pair of descriptors of the upsampled second map of descriptors used to generate the geodesic preservation map are located in a respective local neighborhood of one another.

20. A non-transitory computer-readable medium according to claim 15, wherein generation of the mapping comprises:
   summation of the descriptor difference map and the geodesic preservation map according to respective weights to generate a weighted sum map;
   generation of the mapping based on the weighted sum map;
   evaluation of a loss function; and
   modification of the respective weights based on the evaluated loss function.

* * * * *